United States Patent
Aubourg et al.

(10) Patent No.: US 6,954,686 B2
(45) Date of Patent: Oct. 11, 2005

(54) METHOD OF TUNING A VIBRATION ABSORBER

(75) Inventors: Pierre-Antoine Aubourg, Marseilles (FR); Gianni Naccarato, Alleins (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 10/989,418

(22) Filed: Nov. 17, 2004

(65) Prior Publication Data

US 2005/0165515 A1   Jul. 28, 2005

(30) Foreign Application Priority Data

Nov. 17, 2003  (FR) .................................. 03 13443

(51) Int. Cl.[7] .................................................. G06F 7/00

(52) U.S. Cl. ...................... 701/3; 188/378; 267/140.11

(58) Field of Search ............................. 701/1, 3, 4, 10, 701/8, 300; 267/140, 140.11, 140.13–140.2; 188/378, 379, 380; 244/131, 75 R

(56) References Cited

U.S. PATENT DOCUMENTS

| 5,575,439 | A | * | 11/1996 | Heinze et al. .............. 244/131 |
| 5,620,068 | A | | 4/1997 | Garnjost et al. |
| 5,713,438 | A | * | 2/1998 | Rossetti et al. ............. 188/378 |
| 5,906,254 | A | * | 5/1999 | Schmidt et al. ............. 188/378 |
| 6,101,453 | A | | 8/2000 | Suwa et al. |
| 6,427,815 | B1 | | 8/2002 | Zeller |

FOREIGN PATENT DOCUMENTS

FR             2739670           4/1997

* cited by examiner

Primary Examiner—Richard M. Camby
(74) Attorney, Agent, or Firm—Young & Thompson

(57) ABSTRACT

A method of tuning a vibration absorber on a driving frequency, in which the absorber includes a damper block secured to a support having one end fixedly mounted in an orifice, includes the steps of:
 a measurement step for estimating the offset between the tuned frequency of the absorber and the driving frequency in order to produce a reference value; and
 an adjustment step of adjusting at least one adjustment value of the absorber to the reference value.

8 Claims, 1 Drawing Sheet

METHOD OF TUNING A VIBRATION ABSORBER

The present invention relates to a method of tuning a vibration absorber. It applies in particularly advantageous manner to the field of rotary wing aircraft, in particular that of helicopters.

BACKGROUND OF THE INVENTION

It is known that by the very principle on which they operate, helicopters are subject to high levels of vibration.

The various kinds of vibrations present, particularly when they are felt in the cabin, present numerous drawbacks, in particular in terms of crew and passenger comfort, and also in terms of fatigue of parts and equipment disposed in the cabin.

It is known that one of the main causes of such vibration is the force generated on the main lift and advance rotor by the rotation of its blades.

In particular, it is known that the fuselage of a helicopter is subjected to forces and moments (generated by the main rotor) having a reference driving frequency equal to the product of the number of blades of said rotor multiplied by its frequency of rotation. The response of the fuselage is very sensitive to the differences between the resonant frequencies of the helicopter and said driving frequency.

The vibrations as generated in this way are mainly due to the aerodynamic flow from the blades exciting resonant modes in the structure of the helicopter, and in particular the first mode in lateral bending of the helicopter tail. The vibration due to excitation of this first mode in lateral bending generally presents a frequency of a few hertz and it is extremely troublesome.

It is thus known to provide a passive vibration absorber which is generally embodied in the form of a resonator. Such an absorber is located at locations where it is desired to reduce vibrations, and it acts by being resonant at a predetermined frequency so as to reduce the amount of vibration presenting said frequency.

The vibration absorber is in the form of a damper block secured to a support such as a spring blade. One end of the support is engaged in an orifice formed in a suitable location on the structure of the helicopter, e.g. in the cabin.

Such an absorber can be adjusted by acting on the mass of the damper block, e.g. by means of washers which are added or removed by means of one or more screws secured to the block. It is also possible to adjust it by varying the distance between the block and its mount, for example by causing the block to slide along a groove provided in the support.

The absorber can be adjusted by positioning the helicopter on a vibrating bench driven at the driving frequency. A first sensor measures vibration, in other words acceleration, at the mount, and a second sensor measures acceleration at the damper block.

The phase difference between these two accelerations is measured, and when the absorber is tuned, said phase difference is equal to 90°. Otherwise, successive approximations are made by modifying the adjustment(s) of the absorber so as to come as close as possible to said desired value of 90°.

It is therefore necessary to proceed with a large number of tests on the vibrating bench before obtaining satisfactory adjustment, with the number of tests increasing with increasing precision required for the phase difference.

Documents FR 2 739 670 and U.S. Pat. No. 5,814,963 teach an improvement to the above-mentioned vibration absorber. The damper block is constituted by a main mass fixed on a spring blade having a fixed mount and an auxiliary mass whose position relative to the support is determined by a mechanical actuator such as a stepper motor. The actuator is controlled by a computer which servo-controls the position of the auxiliary mass to the phase difference between the two accelerations.

Such servo-control is relatively expensive since it requires special components. It can also present instabilities when the slope of the curve representing variation in phase difference as a function of frequency is very steep. These instabilities can lead to amplifying vibration at the driving frequency instead of reducing it.

OBJECTS AND SUMMARY OF THE INVENTION

An object of the present invention is thus to reduce vibration in passive manner with maximum effectiveness.

The invention provides a method of tuning a vibration absorber to a driving frequency, said absorber comprising a damper block secured to a support having one end mounted in fixed manner in a structure, in particular having an end mounted in an orifice of the structure, the method comprising:

a measurement step for estimating the offset between the tuned frequency of said absorber and the driving frequency so as to produce a reference value; and an adjustment step for adjusting at least one adjustment value of said absorber to said reference value;

in addition, the measurement step consists essentially in:

establishing an estimated transfer function for said absorber over a frequency band extending on either side of said driving frequency, on the basis of a first series of measurements of the acceleration at the mount in the structure, and on the basis of a second series of measurements of acceleration at said damper block;

defining a theoretical transfer function for said absorber, which function is parameterized by said tuned frequency;

minimizing the difference between said estimated transfer function and theoretical transfer function in order to obtain said tuned frequency; and defining said reference value by means of said tuned frequency.

Advantageously, the definition of said reference value by means of said tuned frequency fo is performed by means of a model having one degree of freedom.

The invention also provides a device for adjusting a vibration absorber, the device comprising means for implementing the above method.

BRIEF DESCRIPTION OF THE DRAWING

The present invention is shown in greater detail below in the following description of embodiments given in illustrative manner with reference to the accompanying figures, in which.

MORE DETAILED DESCRIPTION

Figure 1:
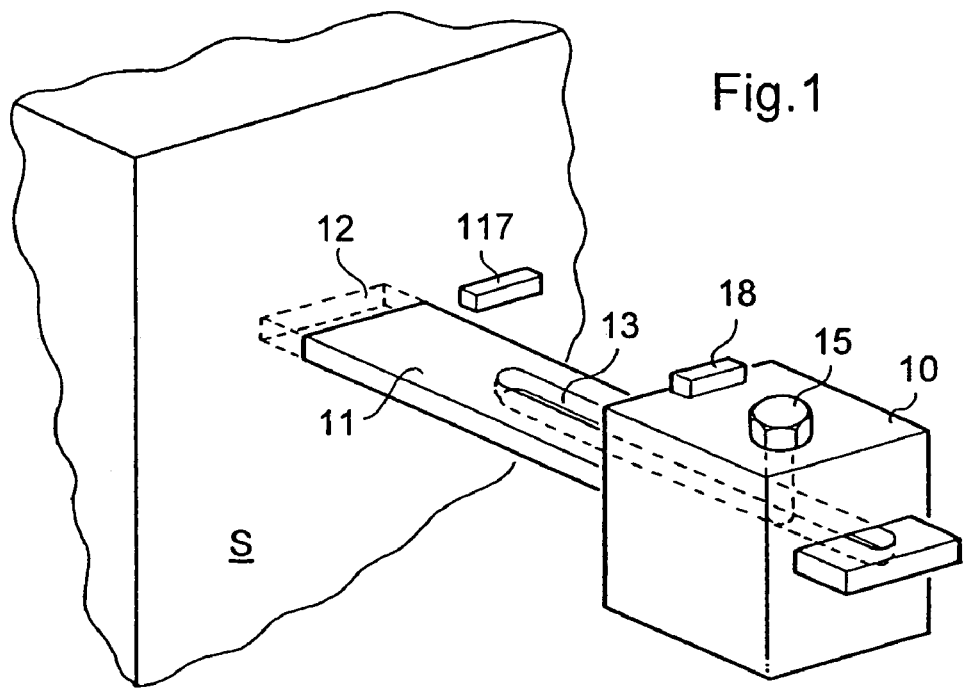
FIG. 1 is a diagram of a vibration absorber.
Figure 2:
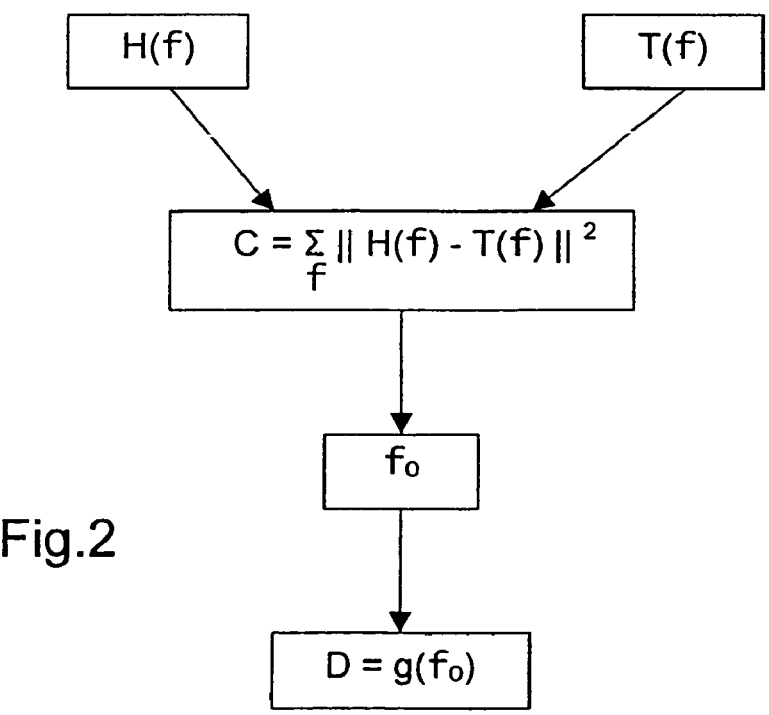
FIG. 2 is a summary of a method of adjusting such an absorber.

With reference to FIG. 1, the vibration absorber comprises a damper block 10 which presents a slot for sliding on a support such as a spring blade 11. The blade is mounted in fixed manner in an orifice 12 at any location on the structure HEL of the helicopter. It is provided with a central groove 13 which co-operates with a bolt 15 for securing the damper block to the blade.

In order to adjust the absorber, the bolt 15 is loosened, the block 10 is moved along the blade to the desired position, and the block is locked in said position by tightening the bolt 15.

A first vibration sensor 17 such as an accelerometer is located at the fixed mount, and a second accelerometer 18 is located on the damper block 10.

While flight testing the helicopter, an estimate is made of the transfer function H(f) between the mount and the damper block of the absorber. To do this, successive values of the first and second accelerations X and Y delivered by the first and second sensors 17 and 18 respectively at a sampling frequency are recorded during a measurement period.

The terms Xi and Yi represent the $i^{th}$ components of vectors X and Y of dimension N ($1 \leq i \leq N$).

It is recalled that so-called "Hanning" weighting on a vector V defines a new vector S:

S and V are vectors of dimension N having real values;

let S(i) and V(i) be the $i^{th}$ components of the vectors S and V:

$$S(i) = \frac{1}{2}(1 - \cos((i-1) \cdot 2\pi/N)) \cdot V(i)$$

It is also recalled that the discrete Fourier transform Z of a vector V is defined as follows:

V is a vector of dimension N having real values, and Z is a vector of dimension N have complex values;

let Z(i) and V(i) be the $i^{th}$ components of the vectors Z and V:

$$Z(i) = \sum_{n=1}^{N} V(i) * e^{-2\Pi j(n-1)(i-1)/N}$$

where j represents the square root of −1.

The following notation is adopted when calculating the transfer function H:

Nf, integer: the number of points in a window consisting in a series of values;

No, integer: the number of values common to two consecutive windows;

Fe: sampling frequency;

H: a vector of dimension Nf having complex values;

F: a vector of dimension Nf having real values;

Pxx: a vector of dimension Nf;

Pxy: a vector of dimension Nf; and ind: an index vector varying over the range 1 to Nf.

The window number QF is calculated as follows:

$$QF=E((N-No)/(Nf-No))$$

where E symbolizes the integer portion.

The following variables are initialized:

$Pxx_0$ to 0, $Pxy_0$ Nf to 0, $ind_0$ to [1 2 ... Nf]

The following operations are performed with index i:

$$Xw_i=S(X(ind_{i-1}))$$

$$Yw_i=S(Y(ind_{i-1}))$$

$$Zx_i=Z(Xw_i)$$

$$Zy_i=Z(Yw_i)$$

$$Pxx_i=Pxx_{i-1}+|Zx_i|^2$$

$$Pxy_i=Pxy_{i-1}+Zy_i*\overline{Zx_i}$$

where $|Zx_i|$ is the modulus vector of $Zx_i$ and where $\overline{Zx_i}$ is the complex conjugate vector of $Zx_i$ $$ind_i=ind_{i-1}+(Nf-No)$$

The iterations are repeated up to index i=QF.

The following is then obtained:

H(f)=Pxy(f)/Pxx(f): a transfer function vector having complex values; and f=[0 1 ... Nf−1]*Fe/Nf: a frequency vector having real values.

The theoretical transfer function T(f) takes the following form:

$$T(f)=[(2\pi fo)^2+2j\alpha.2\pi fo.2\pi f]/[(j2\pi f)^2+(2\pi fo)^2+2j\alpha.2\pi fo.2\pi f]$$

where the parameters $\alpha$ and fo represent respectively the damping and the resonant frequency of the vibration absorber.

The following step consists in minimizing the so-called "cost" function C, i.e.:

$$C = \sum_f \|H(f) - T(f)\|^2$$

This minimization step gives as its result the resonant frequency fo.

By way of example, the procedure for adjusting the vibration absorber can be performed as follows.

Using the following notation:

R: the distance between the damper block and the mount;

fr: the driving frequency; and

D: the reference value or the displacement that needs to be applied to the damper block, this displacement being measured positively on going away from the mount.

By way of example, by calculating the resonant frequency of a mass-spring model having one degree of freedom, it is possible to obtain D as a function of the resonant frequency fo, D=g(fo) as follows:

$$D=[(fo/fr)^{2/3}-1].R$$

Naturally, it is possible to adopt some other type of model.

The absorber can advantageously be adjusted automatically by moving the damper block 10 by means of any conventional device including an actuator. Implementing such automation is not described in greater detail since it is within the competence of the person skilled in the art.

The invention also applies when the absorber is adjusted by means of washers secured to the block, with the number of such washers being increase or decreased in order to adjust the mass of the block of the resonator.

Using the following notation:

R: the distance from the damper block to the mount;
L: the distance from the washers to the mount;
M: the mass of the damper block (not including the washers);
m: the mass of one washer;
U: the number of washers present on the block;
v: the mass of one screw;
W: the number of screws supporting the washers;
fr: the driving frequency;
NR: the reference value or the number of washers that need to be changed, this number being positive when it is necessary to add washers;
Ip=M.R; and
Ir=(m.U+v.W).$L^2$ By again calculating the resonant frequency of a mass-spring model having one degree of freedom, the following is obtained:

$$NR=[((fo/fr)^2-1).(Ip-Ir)](m.L^2)$$

The implementations of the invention described above have been selected because they are of a concrete nature. Nevertheless it is not possible to list exhaustively all implementations covered by the invention. In particular, any step or any means described may be replaced by an equivalent step or means without going beyond the ambit of the present invention.

What is claimed is:

1. A method of tuning a vibration absorber to a reference driving frequency, said absorber comprising a damper block secured to a support having one end mounted in fixed manner in a structure, the method comprising:
   a measurement step for estimating the offset between the tuned frequency of said absorber and the driving frequency so as to produce a reference value; and
   an adjustment step for adjusting at least one adjustment value of said absorber to said reference value;
   wherein said measurement step comprises:
   establishing an estimated transfer function for said absorber over a frequency band extending on either side of said driving frequency, on the basis of a first series of measurements of the acceleration at the mount in the structure, and on the basis of a second series of measurements of acceleration at said damper block;
   defining a theoretical transfer function for said absorber, which function is parameterized by said tuned frequency;
   minimizing the difference between said estimated transfer function and theoretical transfer function in order to obtain said tuned frequency; and
   defining said reference value by means of said tuned frequency.

2. A method according to claim 1, wherein the definition of said reference value by means of said tuned frequency is performed by means of a model having one degree of freedom.

3. A method according to claim 1, in which the structure is the structure of a helicopter.

4. A method according to claim 1, in which, in order to calculate the estimated transfer function on the basis of the acceleration measurements, use is made of Hanning weighting.

5. A method according to claim 1, in which, in order to adjust the resonant absorber, the block is moved along the blade to a required position corresponding to the reference value, and the block is locked in said position.

6. A method according to claim 1, in which, in order to adjust the absorber, the mass of the block is modified.

7. A method according to claim 6, in which, in order to modify the mass of block, the number of washers secured to the block is increased or decreased.

8. A device for adjusting a vibration absorber, the device comprising means for implementing the method according to claim 1.

* * * * *